(12) United States Patent
Wallentin et al.

(10) Patent No.: US 6,347,091 B1
(45) Date of Patent: Feb. 12, 2002

(54) METHOD AND APPARATUS FOR DYNAMICALLY ADAPTING A CONNECTION STATE IN A MOBILE COMMUNICATIONS SYSTEM

(75) Inventors: Bo S. P. Wallentin, Ljungsbro; Leif P. Lindskog, Linköping; Thomas Rimhagen, Linköping; Per O. G. Bark, Linköping; Ulf A. Hansson, Lerum, all of (SE); Harri Vilander, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/186,702

(22) Filed: Nov. 6, 1998

Related U.S. Application Data

(63) Continuation-in-part of application No. 09/099,773, filed on Jun. 19, 1998.

(51) Int. Cl.[7] .............. H04J 3/16; H04J 3/17; H04J 13/02
(52) U.S. Cl. .............. 370/437; 370/235; 370/238; 370/328; 370/329; 370/352; 370/431; 370/441; 370/464; 370/465; 709/226
(58) Field of Search ............... 370/229, 235, 370/236, 238, 277, 328, 329, 338, 352, 353, 354, 355, 437, 441, 442, 443, 445, 465, 466, 912, 913, 431; 709/226, 238, 239, 240

(56) References Cited

U.S. PATENT DOCUMENTS 4,555,805 A * 11/1985 Talbot .............. 455/26

(List continued on next page.)

FOREIGN PATENT DOCUMENTS

| GB | 2 301 992 | 12/1996 |
|---|---|---|
| WO | 96/34504 A | 10/1996 |
| WO | 96/37081 A | 11/1996 |
| WO | 98/03030 A | 1/1998 |
| WO | 98/24250 A | 6/1998 |

OTHER PUBLICATIONS

F. Babich, L. Deotto, and F. Vatta. Transmission of Embedded VBR Multimode Encoded Speech on UMTS Common Packet Channels. 2000 IEEE. pp. 1405–1411.*

(List continued on next page.)

Primary Examiner—Hassan Kizou
Assistant Examiner—Joe Logsdon
(74) Attorney, Agent, or Firm—Nixon & Vanderhye P.C.

(57) ABSTRACT

In a mobile communications system that provides packet data services, a packet data connection is established between a mobile station and a radio access network. The state of the connection is used to specify one of plural different types of radio channels bearing the connection over the radio interface. The connection state preferably also may specify other parameters including, for example, one of plural different mobility management schemes tailored to the selected channel type or channel bit rate(s). The connection is dynamically adapted to an optimal state based on one or more conditions relating to the connection. For example, one or more traffic parameters are determined for the connection and may be used to predict a future value of that parameter. Based on the predicted parameter value or values, an optimal connection state is determined and implemented. If the predicted parameter value changes later in the connection, another connection state may be dynamically selected that is better suited in accordance with the newly predicted parameter value. One example embodiment is based on the amount of data in queue for a packet data connection. Comparison is made with one or more thresholds to decide which type of radio channel should bear the connection. Other factors, parameters, and conditions may be employed along with threshold comparisons to select the optimal radio channel type.

60 Claims, 12 Drawing Sheets

U.S. PATENT DOCUMENTS

| | | | | |
|---|---|---|---|---|
| 4,866,788 A | * | 9/1989 | Mouly et al. | 455/9 |
| 4,962,499 A | * | 10/1990 | Sennema | 370/94.1 |
| 5,648,958 A | * | 7/1997 | Counterman | 370/458 |
| 5,666,348 A | | 9/1997 | Thornberg et al. | |
| 5,673,259 A | | 9/1997 | Quick, Jr. | |
| 5,751,712 A | * | 5/1998 | Farwell et al. | 370/431 |
| 5,818,871 A | * | 10/1998 | Blakeney, II et al. | 375/220 |
| 5,956,368 A | * | 9/1999 | Jamal et al. | 375/206 |
| 6,108,316 A | * | 8/2000 | Agrawal et al. | 370/311 |

OTHER PUBLICATIONS

J. Sachs, S. Wager, and H. Wiemann. Performance of Shared and Dedicated Resources in WCDMA. 2000 IEEE. pp. 759–764.*

F. Borgonovo, A. Capone, L. Fratta, and M. Cesana. Packet Services in UMTS: Research Project. Jul. 2001. http://cerbero.elet.polomi.it/ntw/packet_umts/. pp. 1–3.*

$3^{rd}$ Generation Partnership Project; Technical Specification Group Radio Access Network; Physical Layer Procedures (FDD) (3G TS 25.214 version 3.1.0). 1999. pp. 1–40.*

IEEE 100: The Authoritative Dictionary of IEEE Standards Terms, Seventh Edition. 2000 IEEE. p. 226 and p. 717.*

B. Sharp, E. Grindrod, and D. Camm. Hybrid TDMA/CSMA Protocol for Self Managing Packet Radio Networks. Tactical Communications Department, DRA Malvern. 1995. pp. 929–933.*

K. Natarajan. A Hybrid Medium Access Control Protocol for Wireless LANs. 1992 IEEE. pp. 134–137.*

D. Olsen and N. Dave. Dynamically Reserved Slot Management (DRSM) for Packet Radio Networks. 1991 IEEE. pp. 172–176.*

A. Sugihara, K. Enomoto, and I. Sasase. Hybrid Contention/Reservation Channel–Access Schemes for Integrated Voice/Data Wireless Networks. 1996 IEEE. pp. 638–642.*

*XVI World Telecom Congress Proceedings*, ISS '97, Sep. 21, 1997, pp. 339–345, Andreas Schieder et al., "GRAN[1]—A New Concept for Wireless Access in UMTS".

*IFIP Workshop TC6*, Jul. 2, 1995, pp. 34/1–34/10, XP002085769, Bradford (GB), Z. Fan et al., "ATM Traffic Prediction Using FIR Neural Networks".

*IEEE Network: The Magazine of Computer Communications*, vol. 9, No. 4, Jul. 1, 1995, pp. 34–45, XP000526590, Cui–Qing Yang et al., "A Taxonomy for Congestion Control Algorithms in Packet Switching Networks".

*IEEE Communications*, vol. 15, No. 8, Oct. 1997, pp. 1477–1486, Ermanno Berruto, "Architectural Aspects for the Evolution of Mobile Communications Toward UMTS".

*1993 $43^{rd}$ IEEE Vehicular Technology Conference*, Meadowlands Hilton, Secaucus, NJ, USA, May 18–20, 1993, pp. 520–523, Ermanno Berruto et al., "Variable–Rate for the Best Speech Service in UMTS".

*1994 IEEE*, COMSIG '94, pp. 41–45, M.F. Scheffer et al., "Fuzzy Modeling and Prediction of Network Traffic Fluctuations".

C–T. Lin and G. Lee, "Neural–Fuzzy Systems, " pp. 667–674, Prentice Hall 1996.

Ph.D Thesis, Peter Lindskog, Department of Electrical Engineering, Linköping University, S–581 83 Linköping, Sweden, 1996, "Methods, Algorithms, and Tools for System Identification Based on Prior Knowledge".

Serial No. 09/099,773, Filed: Jun. 19, 1998, Title: "Method and Apparatus for Dynamically Adapting a Connection State in a Mobile Communications System" Inventors: Bo S.P. Wallentin et al. (Attorney Docket: 2380–48).

Serial No. 09/283,248, Filed: Apr. 1, 1999, Title: "Flexible Radio Access And Resources Allocation in Universal Mobile Telephone System" Inventors: Ina Widegren et al. (Attorney Docket: 2380–31).

Serial No. 09/288,862, Filed: Apr. 9, 1999, Title: "Efficient Handling of Connections in a Mobile Communications Network" Inventors: Per H.A. Willars, (Attorney Docket: 2380–128).

* cited by examiner

METHOD AND APPARATUS FOR DYNAMICALLY ADAPTING A CONNECTION STATE IN A MOBILE COMMUNICATIONS SYSTEM

RELATED APPLICATION

This application is a continuation-in-part of pending U.S. patent application Ser. No. 09/099,773, filed Jun. 19, 1998, entitled "Method and Apparatus for Dynamically Adapting a Connection State in a Mobile Communications System."

TECHNICAL FIELD OF THE INVENTION

The present invention relates to mobile communications, and in particular, to dynamically adapting a data communication connection to an optimal state.

BACKGROUND AND SUMMARY OF THE INVENTION

In current and future mobile radio communication systems, a variety of different services either are or will be provided. While mobile telephone systems have traditionally provided voice services, packet data services are also becoming increasingly important. Example packet data services include e-mail, file transfers, and information retrieval using the Internet. Because packet data services often utilize system resources in a manner that varies over the course of a packet data session, the flow of packets is often characterized as "bursty." FIG. 1 is a graph that illustrates packet bursts communicated over time and interspersed over periods where no packets are transmitted. In general, the "density" of packets is high for short time periods and often very low for long periods.

Mobile communication systems must be able to accommodate both circuit-switched services well suited for applications like voice as well as packet-switched services well suited for bursty data applications like e-mail, and at the same time, those services must efficiently use the limited radio bandwidth. In the context of these different types of services, mobile communication systems should provide different types of channels and different schemes for keeping track of the mobile location hereafter referred to as "mobility management."

The Global System for Mobile communications (GSM) offers two categories of services including circuit-switched services via a Mobile Switching Center (MSC) node and packet-switched services via a General Packet Radio Service (GPRS) node. For circuit-switched, guaranteed service, e.g., High Speed Circuit-Switched Data (HSCSD), statically-dedicated traffic channels are employed. For packet-based, best effort service, another set of packet data channels are allocated from a pool of resources on a per packet basis using a media access control protocol or scheduling policy. Mobile communication systems in North America based on IS-95 standard offer packet data services by supporting variable rate transmission on an established, dedicated channel.

There are significant drawbacks with these current approaches which statically map a connection-oriented or a connectionless-oriented service onto a specific channel type. Inevitably, such static mapping results in a non-optimal use of system resources. Packet-switched services, in particular, require variable bandwidths and delays. A high-bandwidth, short-delay packet service like packet-switched audio and video benefits from using a dedicated channel reserved during the connection. But other packet services like messaging and e-mail do not require high bandwidth or short delay. In fact, the bursty nature of e-mail and messaging services underutilize a continuously reserved channel. The present invention overcomes these drawbacks and achieves optimal use of system resources by dynamically determining and allocating a best connection state depending on the packet data to be currently transmitted. In one embodiment, the connection state may specify the type of radio channel. In other embodiments, the connection state may specify additional characteristics. For example, an optimal channel type and a mobility management scheme best suited for that particular channel type may be dynamically allocated.

In a mobile communications system, a connection is established between a mobile station and a radio access network. A "connection" refers to a service provided by the radio access network to permit communication of information over a radio interface between the mobile station and the radio access network in both uplink (from the mobile) and downlink (to the mobile) directions. Such a connection may be established in response to the mobile station or by a core network connected to the radio access network. A connection may remain established even though the mobile station changes geographic cells/areas, i.e., a handover. The state of the connection specifies one of plural different types of radio channels to carry or bear the connection over the radio interface. The connection state preferably may also specify other characteristics such as one of plural, different mobility management schemes tailored to the selected channel type, channel bit rate(s), etc.

The connection is dynamically adapted to an optimal state based on one or more conditions relating to the connection. For example, one or more traffic parameters are determined for the connection and used to predict a future parameter value. Based on a predicted parameter value, an optimal connection state is determined and implemented. If the traffic parameter value changes later in the connection, another channel type may be dynamically selected that is better suited for the newly predicted parameter. Example traffic parameters are the amount of data to be sent in the future over the mobile data packet connection, packet arrival time, and packet density. A connection state may specify a radio channel type. Example channel types include a dedicated radio channel carrying data packets associated with only one mobile station and a shared radio channel carrying data packets associated with more than one mobile station. In addition, the shared radio channel type includes a temporary dedicated radio channel, a random access channel, and a paging channel. Taking the current amount of data in queue as an example traffic parameter, if the amount of data in the queue exceeds a threshold, it may be optimal to employ a dedicated channel to carry that high volume of data. Otherwise, it may be optimal to employ a shared channel.

In a preferred example embodiment based on the amount of data in queue for a packet data connection with a mobile station over a radio access network, if the determined amount of data in queue exceeds the threshold, it is also determined whether the packet data connection is temporarily disconnected or interrupted. If the packet data connection is temporarily disconnected or interrupted, no channel type decision or transfer is made. Otherwise, the packet data connection is established on or transferred to a dedicated radio channel. If the determined amount of packet data in queue is less than a threshold, a shared radio channel may be selected, or one or more other parameters may be considered in deciding what type of radio channel should bear the packet data connection. Preferably, such one or more other parameters relates to a flow of packets over the data packet connection. If the packet flow parameter exceeds a flow threshold, the packet data connection is allocated to a dedicated radio channel. If the packet flow parameter is less than or equal to a flow threshold, the packet data connection is allocated to a shared radio channel. An example flow parameter is the time interval between packets. When the determined time intervals between packets on the connection are similar, the packet data connection is assigned to a dedicated radio channel.

Such an example embodiment may be implemented in the downlink direction from the network to the mobile, although it may be used in the uplink direction as well. A network packet buffer is provided to store packets to be sent to the mobile station. A network packet router provides packets to the packet buffer. When the amount of packets currently stored in the packet buffer exceeds a predetermined percentage of the buffer size, the packet buffer generates a "back pressure" signal used to instruct the packet router to temporarily halt transmission of packets from the router to the packet buffer. The presence or absence of a back pressure signal may be employed in determining what type of radio channel should be allocated to bear the packet data connection.

In another example embodiment, the selected connection state may also specify one of plural mobility management (MM) schemes. In a first MM scheme, the mobile station's location is monitored on an individual cell basis. In a second MM scheme, the mobile station's location is monitored on a routing area basis, where a routing area includes plural cells. Still further, the connection state may specify the bit rate or bit rates. The bit rate may be fixed or, in the case of a variable rate channel, a maximum permitted rate or set of allowed bit rates. Of course, other and/or additional connection state parameters may also be employed.

In yet another example embodiment, an optimal connection state is dynamically selected for a packet data connection from a plurality of connection states based on a predicted traffic parameter, where each connection state specifies a particular radio channel type and a particular mobility management scheme. In this example, the traffic parameter may be packet arrival time, and a non-linear, neural network-based predictor may be used to predict a next data packet arrival time over the connection using data packet arrival times of most recent data packet arrival times. In addition to a single traffic parameter, e.g., next packet arrival time, a next connection state may also be based on other additional factors and considerations including, for example, a desired bearer service, a current connection state, a current radio interference level, and a current amount of data in a queue associated with the connection.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, data flows, network elements, techniques, etc., in order to provide a thorough understanding of the present invention. However, it will be apparent to one skilled in the art that the present invention may be practiced in other embodiments that depart from these specific details. For example, while the present invention is described in the context of a universal mobile telecommunications system that uses GSM/UMTS terminology, those skilled in the art will appreciate that the present invention can be implemented in any mobile communications system. In addition, while much of the description focuses on radio channels, those skilled in the art will recognize that the present invention may be applied to any packet data communications environment. In other instances, detailed descriptions of well-known methods, interfaces, devices, and signaling techniques are omitted so as not to obscure the description of the present invention with unnecessary detail.

Figure 2:
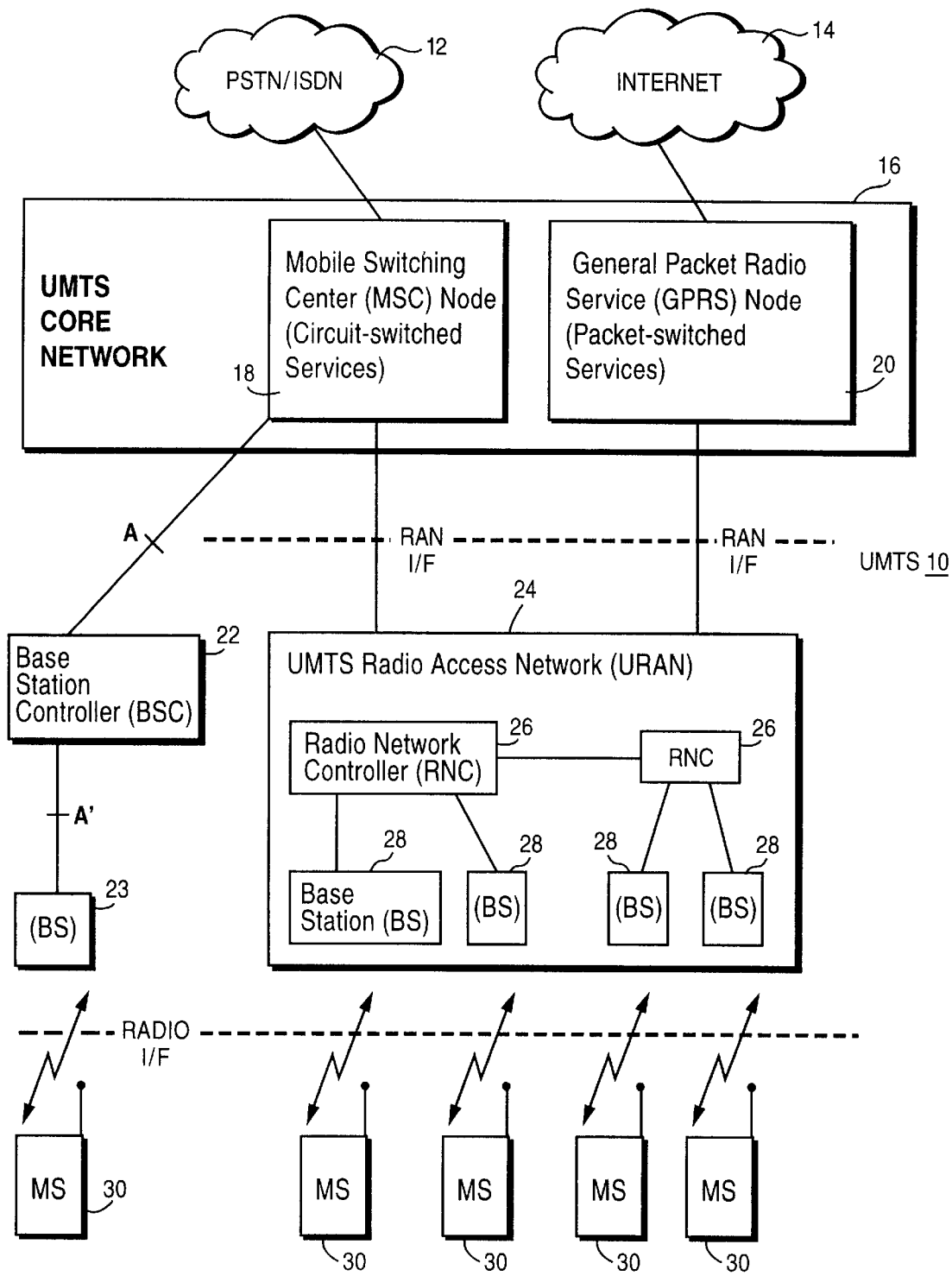
FIG. 2 is a function block diagram of a universal mobile telephone system in which the present invention may be advantageously employed in accordance with a preferred example embodiment.

The present invention is described in the context of a universal mobile telecommunications system (UMTS) 10 shown in FIG. 2. A representative, circuit-switched, external core network, shown as a cloud 12 may be for example the Public Switched Telephone Network (PSTN) and/or the Integrated Services Digital Network (ISDN). A representative, packet-switched external core network shown as a cloud 14, may be for example the Internet. Both external core networks are connected to corresponding service nodes of the UMTS core network 16. The PSTN/ISDN circuit-switched network 12 is connected to a circuit-switched service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface $A_{bis}$. The Internet packet-switched network 14 is connected to a General Packet Radio Service (GPRS) node 20 tailored to provide packet-switched type services. Each of the core network service nodes 18 and 20 connects to a UMTS Radio Access Network (URAN) 24 over a radio access network (RAN) interface. URAN 24 includes one or more radio network controllers 26. Each RNC 26 is connected to a plurality of base stations (BS) 28 and to any other RNC's in the URAN 24.

In the preferred embodiment, radio access is based upon wideband, Code Division Multiple Access (WCDMA) with individual radio channels allocated using WCDMA spreading codes. WCDMA provides wide bandwidth for multimedia services and other high rate demands as well as robust features like diversity handoff and RAKE receivers to ensure high quality.

The URAN 24 provides services between mobile stations 30 and UMTS core network service nodes 12 and 14 (and ultimately to external core network end users). With respect to example embodiments of the present invention described hereafter, the term connection describes an information transfer service provided by the URAN 24. A connection permits transfer of user data information, e.g., packet data, in one or several information streams (bearers) as well as transfer of control signaling information between a mobile station 30 and the URAN 24 in both uplink and downlink directions. Such a connection is established upon request by the mobile station 30 or one of the UMTS core network service nodes 18, 20 and is maintained even as the mobile station moves. In accordance with the invention, the type of packet data service or the connection state may be selected and dynamically changed or adapted to optimize use of radio communication resources.

One type of packet data service is a dedicated service where a dedicated radio channel is continuously reserved between the mobile station and the URAN and is not shared with other mobile stations. Another type of packet data service is a shared service where more than one connection uses the same radio channel, i.e., plural mobile stations share the single channel. In addition to managing different types of radio channels, the mobility of a mobile station is preferably (though not necessarily) managed differently in the present invention depending upon the type of service selected for the connection. Other parameters, such as the connection's bit rate(s), may be specified by the connection service.

Figures 1, 3:
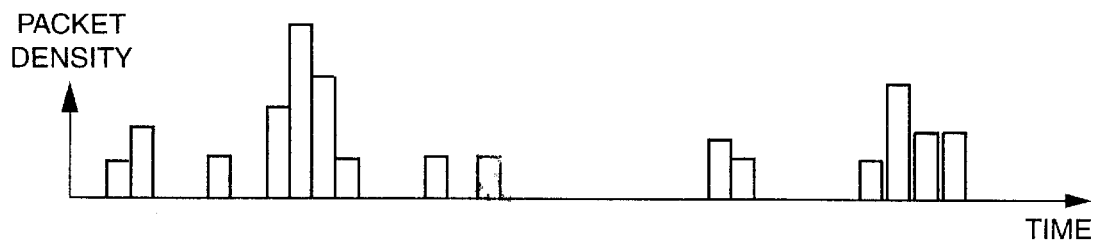
FIG. 1 is a packet density diagram illustrating the bursty nature of packet data communication.
FIG. 3 is a diagram illustrating example base station cells and routing areas.

FIG. 3 is a diagram showing a plurality of adjacent cells, each cell having a corresponding base station. For the dedicated service, when a dedicated radio channel is allocated to a single mobile station, a handover procedure is preferably employed to maintain the connection by transferring it from one base station to another as the mobile moves between cells. Soft and softer handover procedures may preferably be employed in a CDMA system.

For a shared radio service, it may be more efficient to manage mobility from a signaling point of view. A shared radio channel associated with a shared radio service will typically be selected for low traffic and/or where a packet transfer delay is acceptable. In these situations, a mobility management scheme based upon mobile station registration is preferred. When the mobile station enters a new cell, it sends a registration message to the associated network. However, in periods of low traffic from that mobile station, it is unnecessary for the mobile station to register in every cell. In fact, cell update messages may produce as much traffic or even more traffic than substantive user data traffic. For that situation, a next level of registration based on routing areas is desirable. FIG. 3 shows two routing areas: one encompassing four adjacent cells and a second encompassing two adjacent cells. If a mobile station changes routing areas, it sends a routing area registration message to the nearest base station. The network stores the routing area identification number where the mobile station last registered. When a data packet is to be sent to that mobile station, the network sends a page to the mobile station, and the mobile station sends a page response to identify the cell where packets should be sent.

Figure 4:
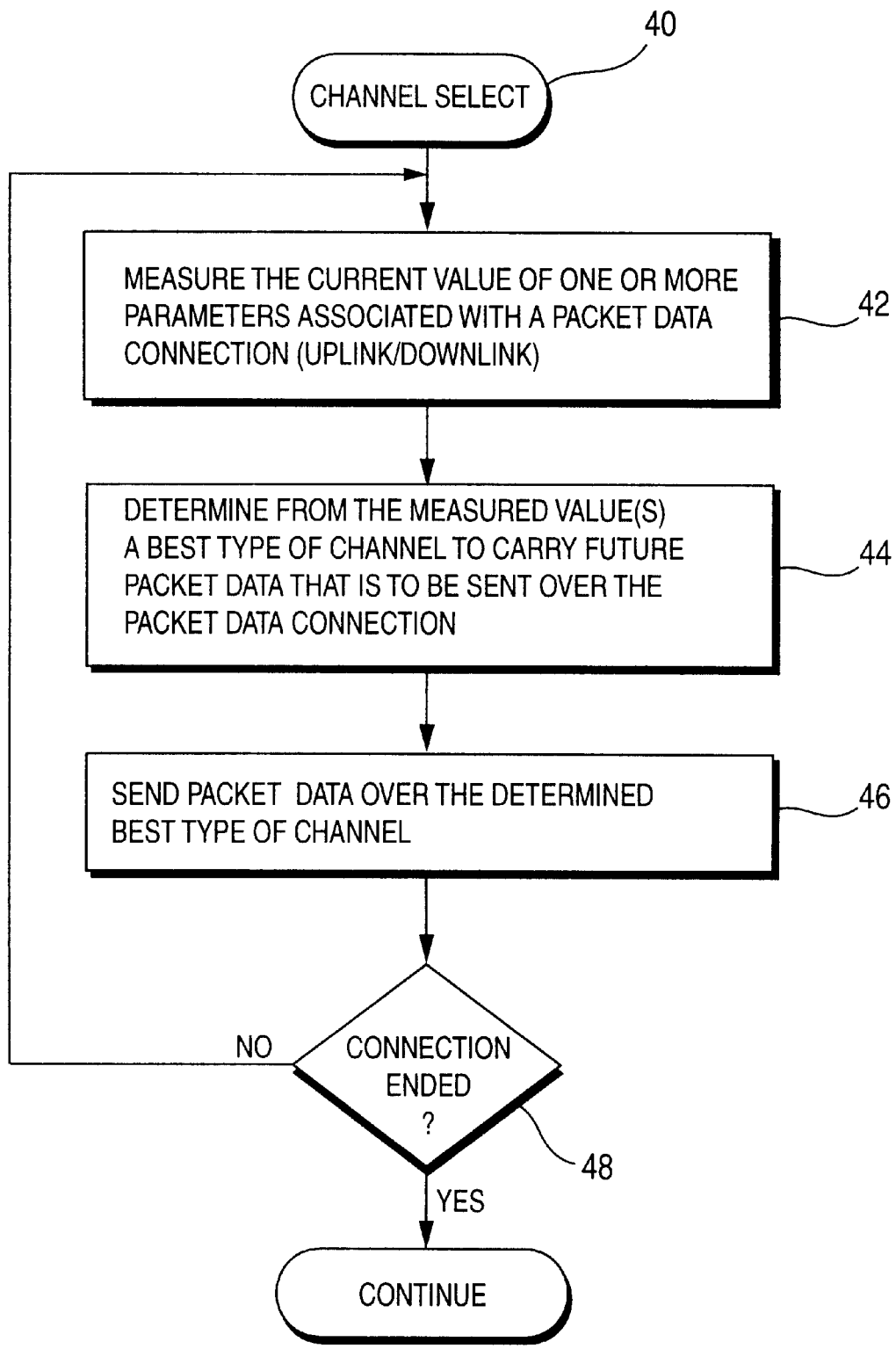
FIG. 4 is a flowchart diagram illustrating example procedures in accordance with a Channel Select routine in accordance with an example embodiment of the present invention.

With respect to one example embodiment of the invention that focuses just on channel type, FIG. 4 illustrates in flowchart format a Channel Select routine (block 40). Accordingly, the "connection state" in this example is characterized by channel type. However, the connection state may specify a different characteristic or more than one characteristic.

Assuming that a connection is already established between the mobile station and the URAN, a current value of one or more traffic parameters associated with that packet data connection is measured (block 42). It may be desirable to make separate measurements of the one or more parameters in both the uplink and the downlink directions because different channel types may be allocated to the uplink and the downlink and because the channel type and mobility management scheme depend on the traffic in both uplink and downlink directions. From the measured value(s) of the one or more connection parameters, the optimal type of channel is determined to carry future packet data to be sent over the packet data connection (block 44). Packet data are then sent over the selected type of radio channel (block 46). A decision is made in block 48 whether one or more conditions have changed, and if so, the Channel Select routine repeats. As a result, the optimal type of channel for the current situation is dynamically determined and allocated so that system resources are efficiently employed.

Figure 5:
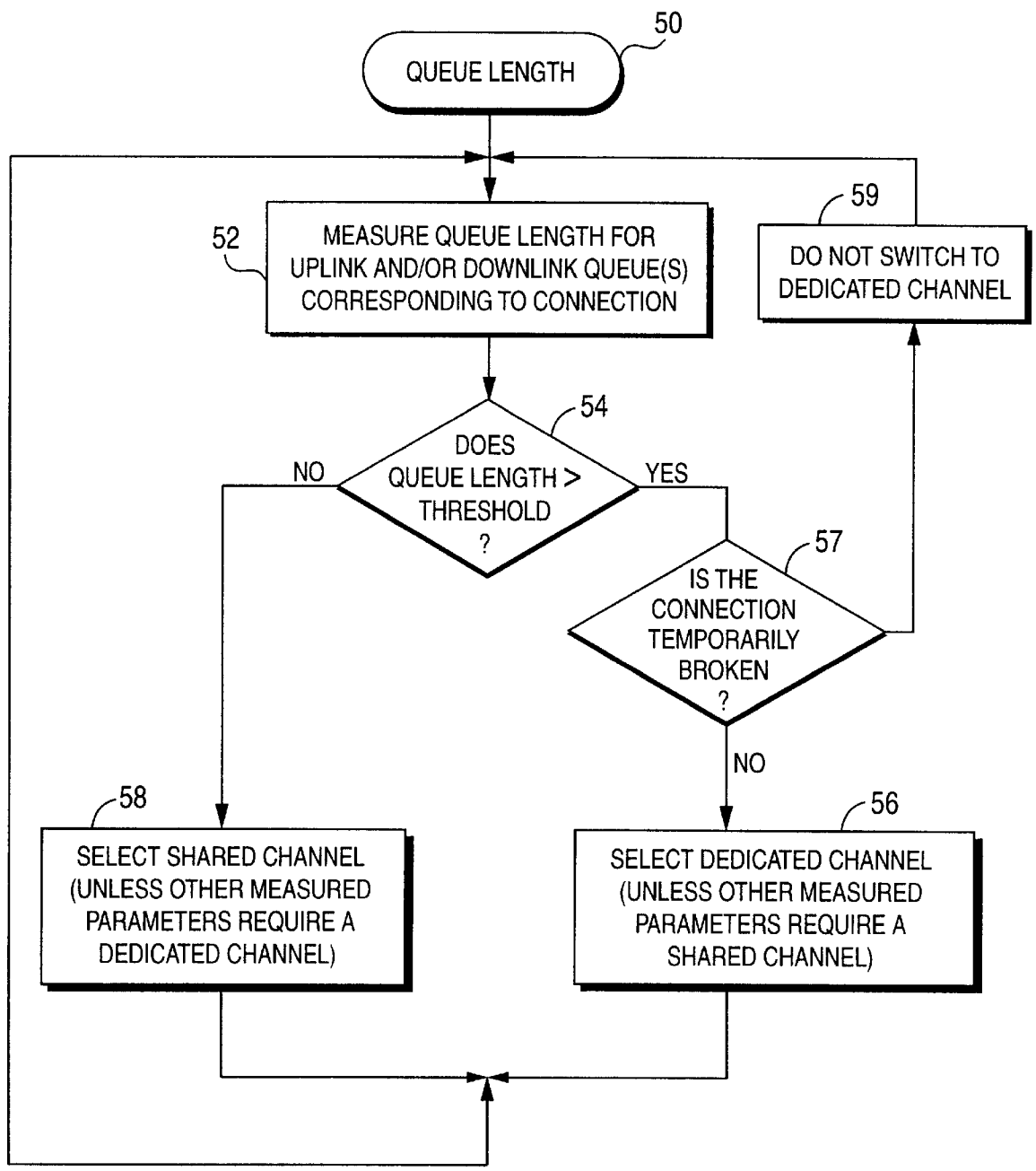
FIG. 5 is a flowchart diagram illustrating example procedures for dynamic channel type selection based on a current amount of data in a connection queue in accordance with an example embodiment of the present invention.

An optimal channel type may be dynamically/adaptively determined and allocated based on a single, relatively simple parameter such as the amount of data currently stored in a connection queue, i.e., queue length, as described now in conjunction with the Queue Length routine (block 50) shown in FIG. 5. Queue length may be a good predictor of future data packet traffic intensity especially in the downlink direction to the mobile. This is useful because in some packet applications, the larger blocks of data are communicated in the downlink direction to the mobile. Of course, current queue lengths may be specified in an uplink and/or downlink queue(s) corresponding to the connection. Alternatively, a total payload parameter corresponding to the sum of the uplink and downlink queue length may also be employed.

A decision is made in block 54 whether the measured queue length exceeds a threshold. If it does, a decision may be made to select a dedicated type channel (block 56). Even though the large queue length indicates that a dedicated channel is appropriate, it may be desirable or necessary to consider other measured parameters which may dictate otherwise. For example, it may be that the connection has been temporarily broken or interrupted (block 57). If so, it is better not to switch channels (block 59) since the large queue is likely the result of the interrupted connection. If the queue length does not exceed the threshold, it may be more optimal to transport the smaller payload over a shared type channel (block 58). This decision may also be "overruled" if other parameters are taken into account which, on balance, indicate that a dedicated channel is either required or more optimal.

Figure 6:
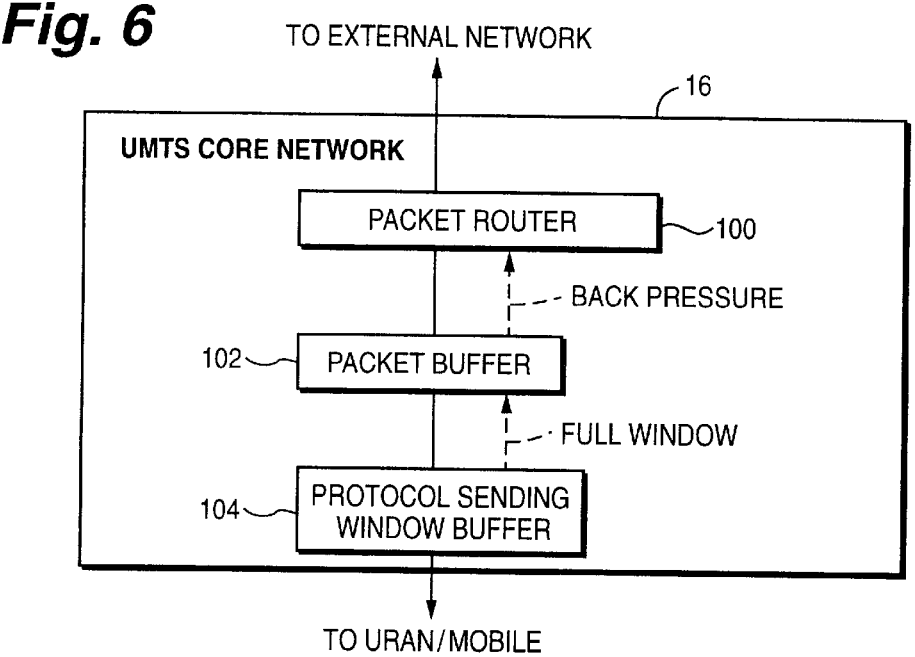
FIG. 6 is a diagram showing various buffers that may be employed in a UMTS network.
Figure 7:
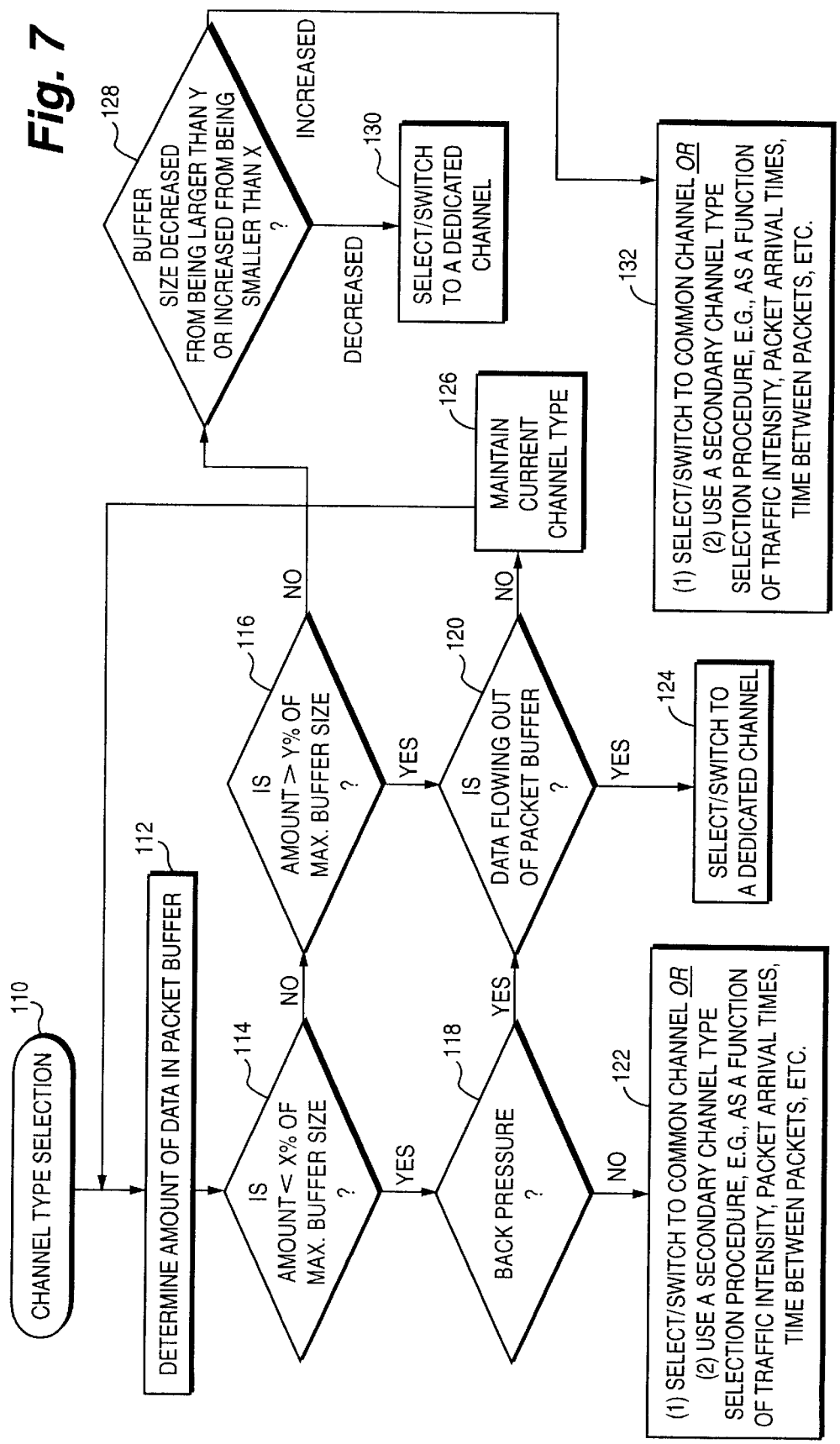
FIG. 7 is a flowchart diagram illustrating channel type selection procedures in accordance with an example embodiment of the present invention.

Another example channel type selection embodiment which takes into account queue length or the amount of data in a packet buffer is now described in conjunction with FIGS. 6 and 7. FIG. 6 is a diagram of a generic UMTS core network node 16 that includes a packet router 100, a packet buffer 102, and a packet window buffer 104. The packet router 100 receives data packets from an external network to be transmitted to a particular mobile station over a packet data connection via the URAN 24. The packet router 100 includes a buffer for storing those data packets and for transferring them at a particular rate to the packet buffer 102 used to interface with the URAN 24. Packets from the packet buffer 102 are then delivered to the mobile station via the URAN 24 using an optimally selected radio channel.

When large amounts of data are provided from the packet router 100 to the packet buffer 102, the packet buffer 102 may not be of sufficient size to store all of the data. As a result, a "back pressure" mechanism is employed to manage packet flow and transfer. More specifically, a back pressure signal is transmitted from the packet buffer 102 back to the packet router 100 when the amount of data in the packet buffer 102 exceeds a particular percentage, e.g., eighty percent, of its maximum capacity. The back pressure signal is thereafter removed when the amount of data in the packet buffer 102 is less than a lower percentage, e.g., thirty percent, of its maximum capacity. The back pressure mechanism temporarily buffers in the packet router buffer 100 rather than in the packet buffer 102 because the packet router buffer 100 is considerably larger than the packet buffer 102. Also, it may be more optimal for higher layer protocols, e.g., TCP, to make decisions to discard packets on the IP-level when the packet router buffer 100 is full rather than when the packet buffer 102 is full.

A protocol sending window buffer 104 stores the packets transmitted from packet buffer 102 to the URAN 24 that have not yet been acknowledged by the URAN as accurately received. When a packet stored in the protocol sending window buffer 104 is acknowledged as accurately received, it is removed. If an accurate acknowledgment is not received within an appropriate time for a transmitted packet, that packet is then retrieved from the packet window buffer and retransmit. In situations where the protocol sending window buffer 104 fills up to a certain level with outstanding packets not yet acknowledged, it can be reasonably inferred that there is a problem with the radio channel connection. For example, the radio could be behind a building, under a bridge, going through a tunnel, etc. or there may be excessive interference, such as in a crowded cell. Such circumstances are usually temporary. When the maximum number of outstanding acknowledgments is reached, the packet sending window is determined to be full. As will be described below, a "full window" may be taken into account in the channel type selection process.

Reference is now made to the Channel Type Selection routine (block 110) shown in flowchart form in FIG. 7. An amount of packet data currently stored in the packet buffer 102 is determined (block 112). A decision is made in block 114 whether the determined amount is less than X percent of the maximum packet buffer size. If so, another decision is made (block 118) whether a back pressure signal currently exists. If not, the relatively small amount of data in the packet buffer and the lack of back pressure suggest that it is desirable to select or transfer the packet data connection to a common or shared channel (block 122). As another alternative embodiment, a secondary channel type selection procedure may be performed at this point to determine the optimum channel type to carry the mobile connection rather than automatically selecting a common channel (block 122). The secondary channel type selection procedure may be based on current or predicted traffic intensity, packet arrival times, time between packets, and other parameters related to packet flow.

If the amount of data currently in the packet buffer 102 exceeds or is equal to X percent of the maximum buffer size, a decision is made (block 116) whether that amount is greater than or equal to Y percent of the maximum buffer size of the packet buffer 102, where Y is larger than X. The two threshold comparison process adds hysteresis to prevent unnecessary or at least too frequent switching of channel type. Thus, if the amount does not exceed Y percent, a hysteresis type of decision is made in block 128. For example, a decision is made whether the buffer size decreased from being greater than Y to less than Y or whether the buffer size increased from being less than X. If the buffer size decreased from being greater than Y, a dedicated channel is selected (block 130). However, if the buffer size increased from being less than X, a common channel is selected (block 132). In an alternative embodiment, secondary channel type selection procedure such as that described for block 122 may be employed (block 132) rather than automatically always selecting a common channel. A secondary channel type selection procedure adds flexibility to the more rigid threshold comparisons in blocks 114 and 116.

On the other hand, if the amount of data currently in the packet buffer 102 exceeds Y percent of the maximum buffer size, a decision is made in block 120 whether data is currently flowing out of the packet buffer 102. This determination is made by the protocol sending window buffer 104 as described above with respect to FIG. 6. If a full window signal is generated by the protocol sending window buffer 104 indicating a broken or interrupted connection, a decision is made that data is not flowing out of the packet buffer 102, and the current channel type is maintained (block 126). That no data is flowing out from the buffer may be due to temporary hostile radio channel conditions, which are rather common in cellular systems. If data is flowing out of the packet buffer 102, (no full window signal), such a large amount of data currently in the packet buffer suggests that it would be better and/or more efficient to select or switch to a dedicated channel to carry the call connection (block 124). Similarly, if a back pressure signal is generated by the packet buffer 102 to the packet router 100 (block 118), the same decision is made in block 120 assuming data is flowing out of the packet buffer 102. The back pressure condition suggests that there is considerable data to be transmit and that it would be better and/or more efficient to switch to a dedicated channel to carry that data to the mobile (block 124). If the protocol sending window buffer 104 generates a fall window signal, the current channel type may be maintained (block 126) despite the back pressure condition.

With respect to the secondary channel type selection procedure referenced in blocks 122 and 128, packet arrival time may be a preferred criterion for delay sensitive applications like voice over IP which produce a long stream of regularly spaced (in time) small size packets. These packets may not aggregate to a large amount of data in the packet buffer 102 sufficient to warrant selection or switching to a dedicated channel. Nevertheless, low delay is important for voice over IP which typically requires a dedicated channel. Thus, the secondary channel type selection procedure may determine the amount of time between received packets of a connection and is fairly regular, and decide to select or switch to a dedicated channel. Hysteresis is also preferably employed in the secondary channel type selection procedure.

In another preferred example embodiment of the present invention, a packet arrival rate or a packet density for a particular data packet connection may be used to predict the future packet flow for a particular connection. That prediction may be used to determine the optimal type of channel and preferably also the type of mobility management scheme to use during a connection. Of course, other parameters, such as the connection's bit rate(s), the current number of idle devices like receivers in each base station, the current number of idle spreading codes, etc. may also be specified. For convenience and simplicity, "connection state" hereafter for this example embodiment refers to a radio channel type and/or a type of mobility management scheme. However, those skilled in the art will appreciate that other connection state parameters are encompassed by the present invention.

Depending on newly predicted packet flows, the selected channel type and/or mobility management scheme may be changed several times for the connection. An example of how the selected channel type may change between a dedicated and a shared type channel during a connection is now described. Two data amount thresholds may be employed to introduce hysteresis into the channel type decision. Changing channel types requires a certain amount of signaling "overhead" (including delay and interference) for channel setup and take down. This overhead is sometimes more significant than the advantage to be gained by switching channel type. As mentioned earlier, hysteresis is beneficial because it restricts channel type changes to those that are worth the overhead associated with the change. More specifically, when the amount of data to be transmitted is large and exceeds a higher one of the two thresholds, the shared channel may be changed to a dedicated channel. If the amount of data is between the two thresholds, no change is made. If the amount of data to be transmitted is small and less than the lower one of the thresholds, a common or shared channel is selected.

In a preferred, example embodiment, the lower threshold is at or near zero so that an entire amount of data present/in queue is transmit over the dedicated channel before any channel type switch is made. It may also be desirable when the amount of data to be transmit is small, to determine an average intensity parameter or other parameter such as average packet arrival time. If that average traffic intensity or other parameter exceeds a parameter prescribed amount, then it may be preferable to maintain the existing dedicated channel.

Accordingly, once a dedicated channel is assigned to a packet data connection, the next amount of packet data to be sent is determined. If that amount exceeds the first threshold, the connection state is maintained. If the amount is less than the first threshold but greater than the second threshold, the connection state is also maintained. However, if the amount of data to be transmit is less than the second threshold, the connection state is changed to release the dedicated channel and to employ a shared channel.

Another example method for determining whether to switch from a dedicated radio channel to a shared radio channel is now described. After a last amount of data to be sent is transmitted, (e.g., the transmit queue is empty), a predefined time period is monitored. If a new data packet is not received at the end of that predetermined time period, then the dedicated channel is released, and a new shared channel is allocated to the connection. The predefined time period may be determined based on one or more parameters including, for example, a number of available or idle channel resources which may include the number of idle base station receivers. If there is no idle base station receiver, a dedicated radio channel cannot be assigned. However, the connection can be assigned to a shared radio channel. Another factor that may be considered in a CDMA system is the number of idle spreading codes for downlink communications.

Figure 8:
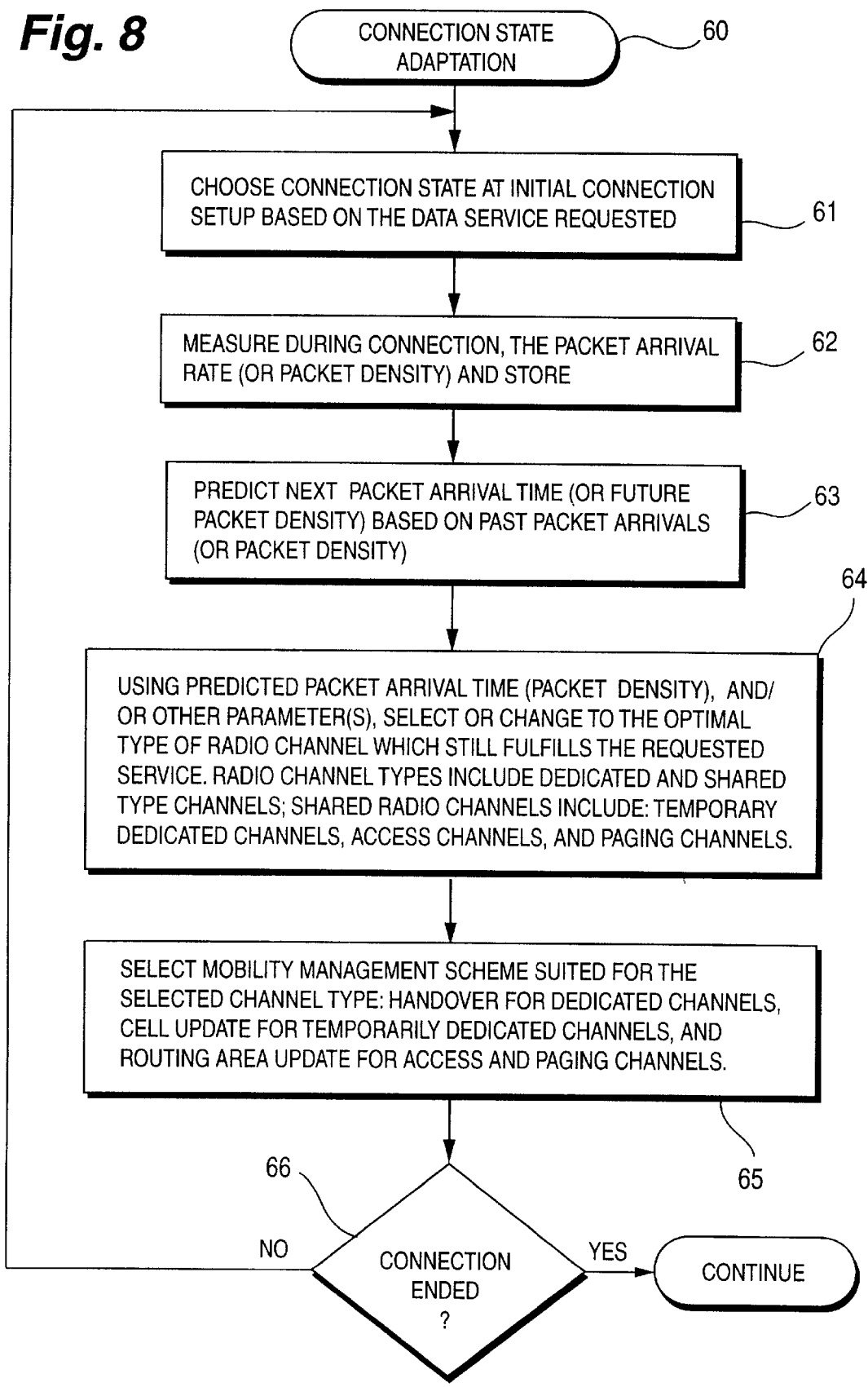
FIG. 8 is a flowchart diagram illustrating example procedures for implementing a Connection State Adaptation routine in accordance with an example embodiment of the present invention.

Reference is now made to the Connection State Adaptation routine (block 60) shown in FIG. 8. As set forth earlier, a connection state in this illustrative example includes a selected radio channel type and a selected mobility management scheme. A connection state is initially selected at connection setup based upon a packet data service requested (block 61). Thereafter, the packet arrival rate or packet density for the connection is measured and stored (block 62). The next packet arrival time for the connection is predicted based on the stored past packet arrival times (block 63). Alternatively, if packet density is the parameter employed, a future packet density is predicted based on past packet density determinations. Using the predicted packet arrival time (or predicted packet density), and possibly (but not necessarily) other parameter(s), an optimal type of radio channel is selected which still also fulfills the requested packet data service (block 64). Radio channel types include both dedicated and shared types of channels. In addition, shared radio channels include temporary dedicated channels, access channels, and paging channels. The optimal mobility management scheme best suited for the selected channel type may also be selected along with other parameters. For reasons described above, a cell update type of mobile management scheme is preferably selected for dedicated, temporarily-dedicated, and access radio channels. A routing area update type of mobility management scheme is preferably selected for paging channels (block 65). A decision is made in block 66 whether the connection has been disconnected. If not, the Connection State Adaptation procedures are repeated beginning at block 62.

Figure 9:
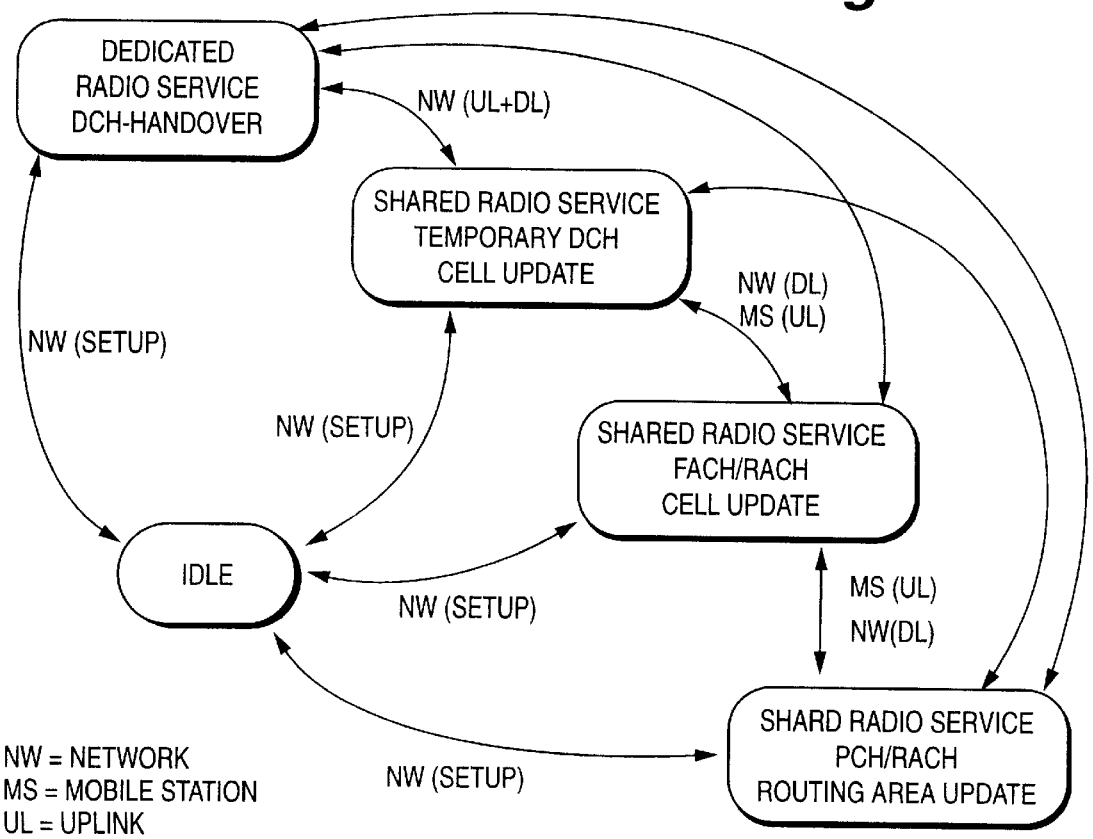
FIG. 9 is a connection state diagram in accordance with an example embodiment of the invention.

FIG. 9 is a state diagram that illustrates the adaptive nature of connection state selection in accordance with this example embodiment where connection states are correlated with radio services. Initially, the connection state is "idle" before a packet data connection is established. When a packet data connection is initially set up by the radio access network, either upon request from a core network or the mobile station, one of the four active connection states is selected using parameter information from the requested data service, e.g., quality of service type parameters such as maximum and average bit rate, delay parameters, etc. All of such characteristics may be condensed into a "service vector" used to make the initial choice of connection state.

The four active connection states include (1) a dedicated radio service that employed a dedicated radio channel (DCH), (2) a shared radio service that employs a temporary DCH, (3) a shared radio service that employs forward access channels (FACH) and random access channels (RACH), and (4) a shared radio service that employs paging channels (PCH) and RACHs. Each connection state also specifies a corresponding mobility management scheme. The dedicated radio service employs handover as the mobility management scheme. The shared radio service using a temporary dedicated channel and the shared radio service for forward and random access channels both employ cell update mobility management schemes. However, the paging channel/random access channel shared radio service uses a routing area update mobility management scheme.

As packets are sent over the connection, the flow of packets is monitored and evaluated, and if appropriate, a new connection state is selected. Based on downlink (DL) packet flow measurements and uplink (UL) packet flow measurements, the radio access network may initiate a connection state change on either or both the downlink and the uplink. The mobile terminal may also initiate a connection state transition based upon packet flow measurements on the uplink between the various shared radio services. When the connection is released by the core network, the radio access network, or the mobile terminal, the flow returns to the idle state.

Figure 10:
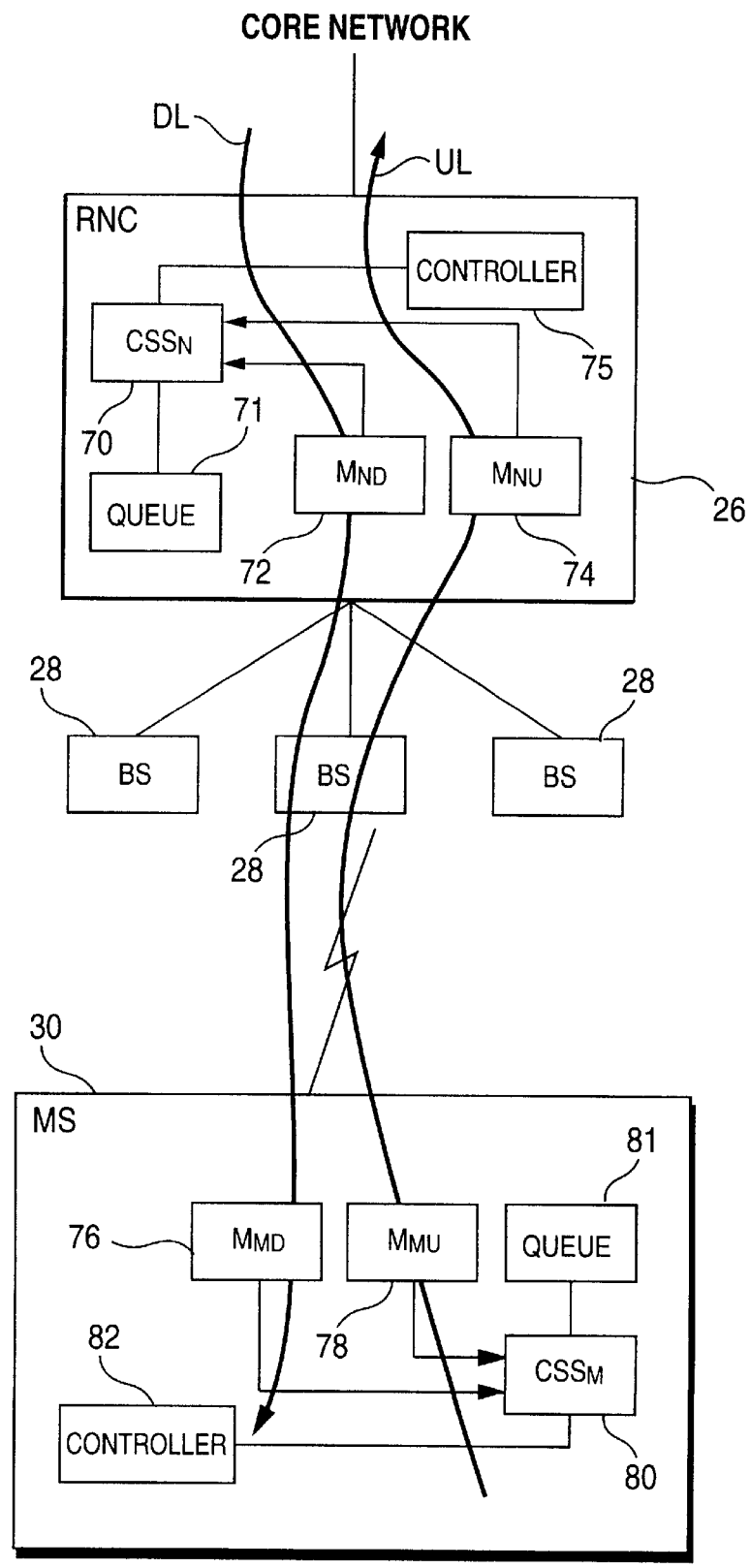
FIG. 10 is a function block diagram illustrating an example implementation of the present invention in the context of the mobile communications system shown in FIG. 2.

FIG. 10 illustrates one example implementation in the mobile communications system of FIG. 2. A connection state selector (CSS) is provided in each radio network controller 26 ($CSS_N$70) and each mobile station 30 ($CSS_M$80). The radio network controller 26 also includes packet flow measurement units for both uplink and downlink directions corresponding to $M_{ND}$72 and $M_{NU}$74. Similarly, the mobile station 30 includes downlink and uplink packet flow measurement units $M_{MD}$76 and $M_{MU}$78. The uplink and downlink directions of the established connection are shown in bold lines. Connection queues 71 and 81 are provided in both the RNC and the mobile station which store current data packets to be sent over the connection. It is to be understood that a connection state selector may be placed in any network node in addition to each mobile station. However, locating the CSS in a base station rather than in the radio network controller may result in significant data shuffling between base stations when the mobile station changes cells to another base station, e.g., historical data for the connection. Since the radio network controller offers the packet data service to the core networks, it is preferable to locate the CSS in the RNC.

The measurement units in the mobile station and in the RNC measure the flow of packets (and other parameters if desired) in both uplink and/or downlink directions by storing packet arrival times which are then transferred to the respective connection state selectors 70 and 80. Rather than packet arrival times, packet density may be employed as the data flow parameter. Packet density may be a better parameter if the packet size is variable. When a connection state selector determines that a connection state change is necessary, it sends a signal to a corresponding controller, i.e., the RNC controller 75 or the mobile station controller 82. The respective controller handles the signaling over the radio interface in order to make the connection state change.

Figure 11:
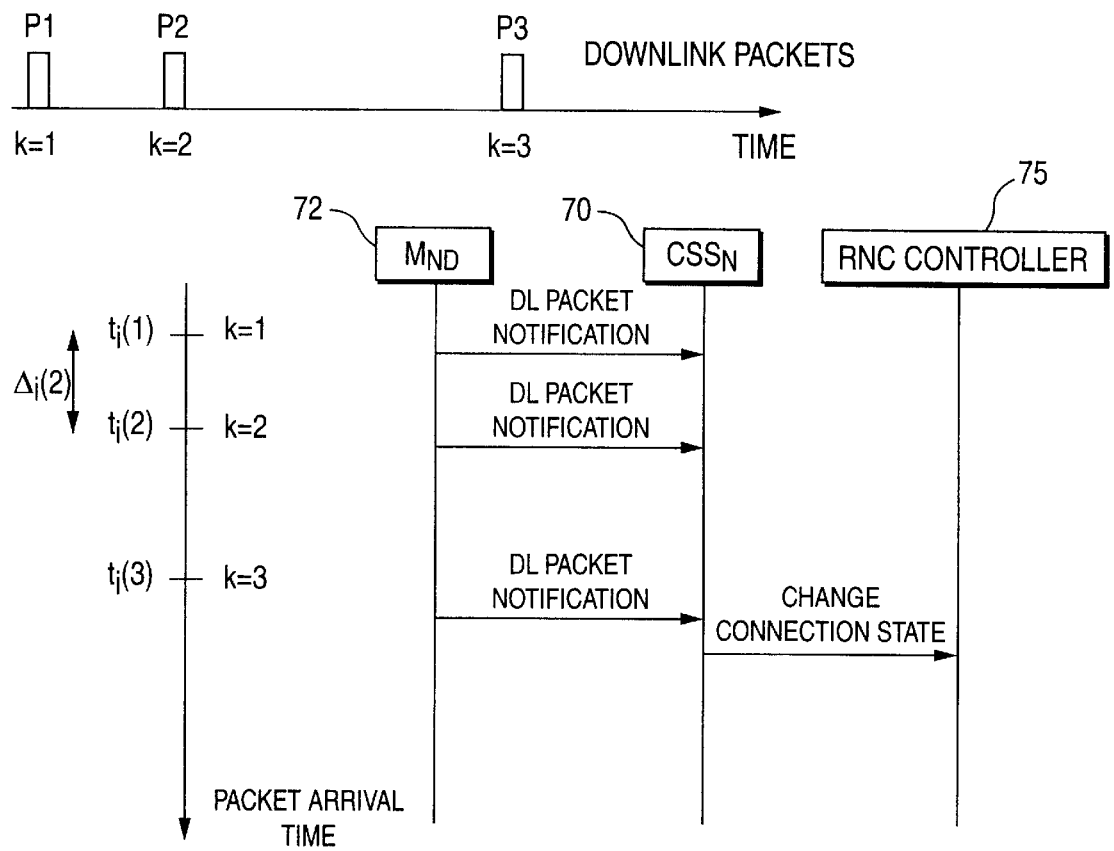
FIG. 11 is timing diagram illustrating data packet arrival times.

FIG. 11 is a diagram which shows an example of downlink packet flow and the interaction between the network downlink measurement unit 72, the network connection state selector 70, and the RNC controller 75. At each packet arrival, the measurement unit 72 sends a downlink packet notification message to the connection state selector 70 containing the packet arrival time $t_i(k)$, a current amount of data $Q_i(k)$ in an incoming packet queue to be transmitted form the network to the mobile station corresponding to this connection, and a measured interference $I_i(k)$ associated with that packet (the uplink interference may, for example, be measured by the BS and sent regularly to the MS and RNC while the downlink interference may be measured by the MS and sent regularly to the RNC via the BS). The subscript i refers to an $i^{th}$ connection, and k refers to the $k^{th}$ packet. Therefore, $t_i(k)$ is the arrival time of packet k during the $i^{th}$ connection. The time elapsed between the k–1$^{th}$ packet and the $k^{th}$ packet during the $i^{th}$ connection is indicated as $\Delta_i(k)$.

Based on the downlink packet identification messages corresponding to the three arrived example packets P1–P3, the network connection state selector 70 may decide to change connection state and sends a change connection state message to the RNC controller 75 with the next connection state. In the context of a CDMA system, if the new connection state is a dedicated radio channel or a temporary dedicated radio channel, the RNC controller allocates a spreading code to the connection and sends messages to the base station(s) currently handling the call as well as to the mobile station with appropriate change of connection state information. Similarly, the RNC controller notifies the mobile station and base station of the mobility management scheme.

Figure 12:
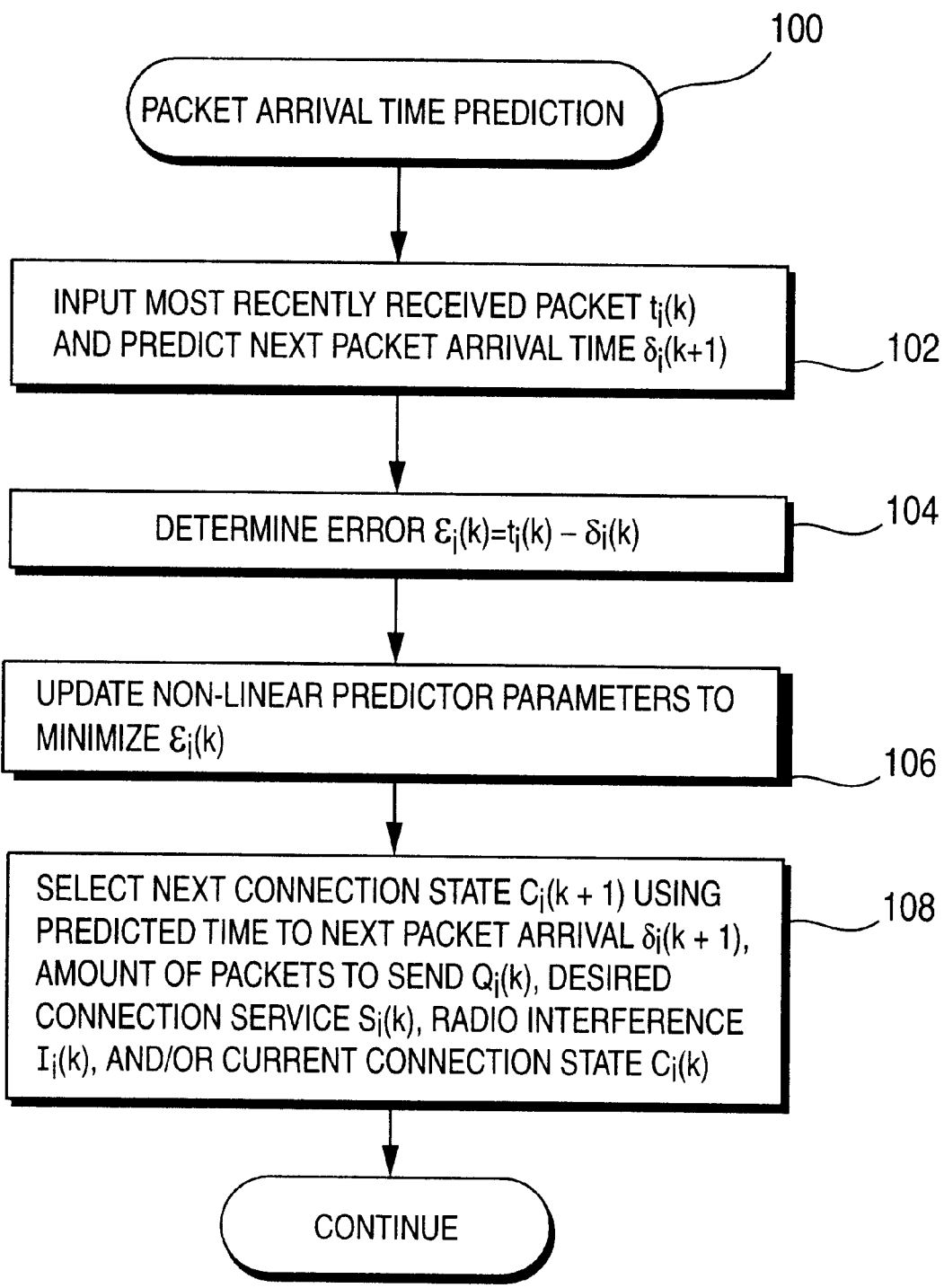
FIG. 12 is flowchart diagram illustrating example procedures in accordance with a Packet Arrival Time Predication routine in accordance with a preferred example embodiment of the present invention.
Figure 13:
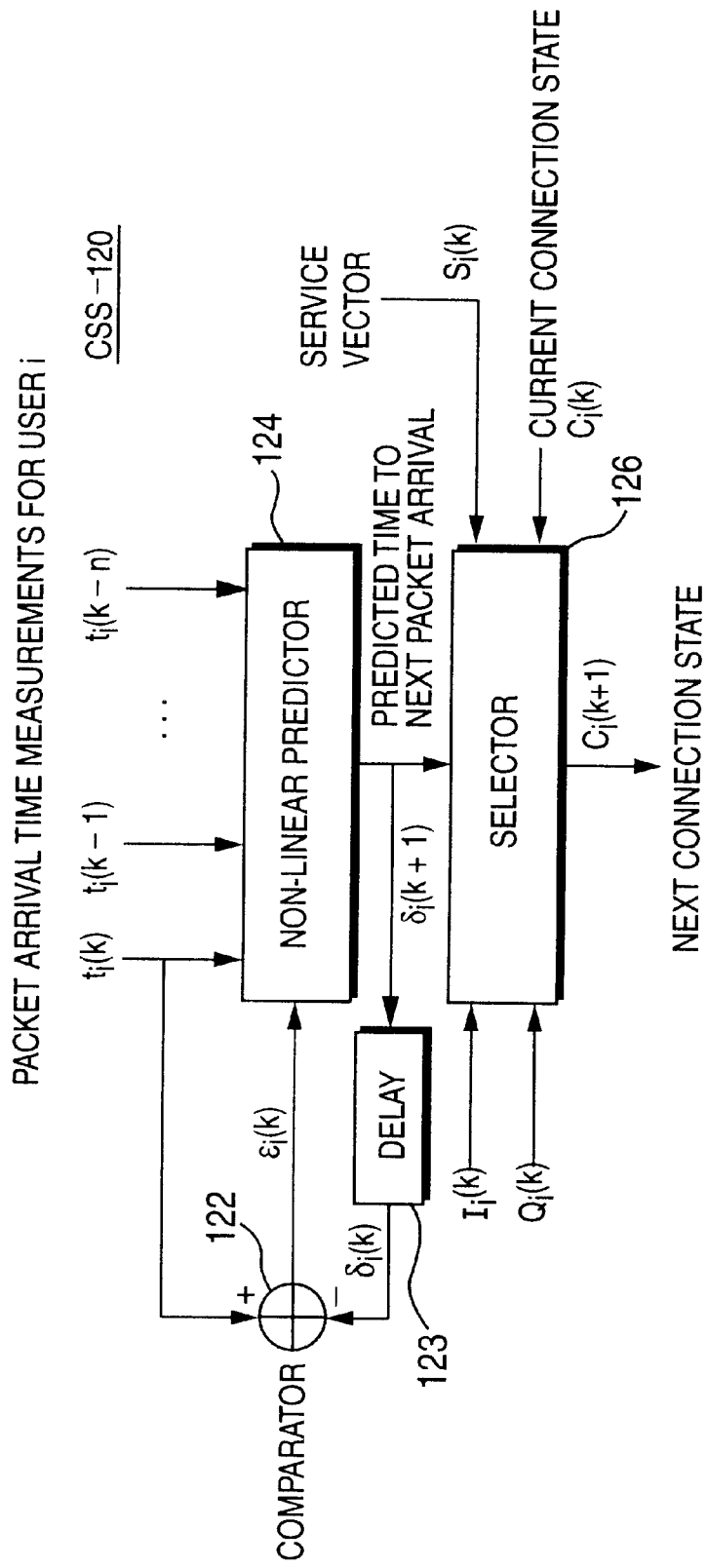
FIG. 13 is a diagram illustrating a connection state selector used to select a next connection state in accordance with a preferred example embodiment of the present invention.

Further example implementation details regarding prediction of next packet arrival time and connection state selection based thereon are provided in conjunction with Packet Arrival Time Prediction routine (block 100) shown in flowchart format in FIG. 12 and the function block diagram illustrating an example connection state selector shown in FIG. 13. In general, the connection state selector 120 for each connection state iteration, inputs a most recently received packet arrival time $t_i(k)$ and predicts in a non-linear fashion a next packet arrival time $\delta_i(k+1)$ using a non-linear predictor 124 (block 102). The predicted next packet arrival time is input into a comparator 122 after a corresponding delay 123 and compared with the most recent packet arrival time $t_i(k)$ to generate an error $\epsilon_i(k)$ (block 104). The error $\epsilon_i(k)$ is used to update the non-linear predictor parameters in such a way so as to minimize the error $\epsilon_i(k)$ (block 106).

A selector 126 receives the predicted time to next packet arrival $\delta_i(k+1)$ from the non-linear predictor 124 and uses that prediction to determine a next connection state $C_i(k+1)$. Again, while the next connection state may be selected based simply on that parameter $\delta_i(k+1)$ alone, in a preferred example embodiment, the selector 126 takes into account one or more other parameters such as an amount of packets (queue length $Q_i(k)$) to be sent over the connection, a service vector $S_i(k)$, current radio interference $I_i(k)$, and/or the current connection state $C_i(k)$ (block 108).

Typically, a long queue suggests a dedicated channel or a temporary dedicated channel. A common channel is probably better suited for a short queue. A service vector requiring a high data rate and/or short delay indicates that a dedicated channel or a temporary dedicated channel is a better selection. A high radio interference value indicates that a dedicated channel most likely is preferred, as opposed to a temporary dedicated channel or common channel, because temporary dedicated and common channels generate greater interference than a dedicated channel. Still further, an earlier predicted packet arrival time indicates selection of a dedicated channel—even if the queue is short—especially if the bearer service requires a short delay.

Figure 14:
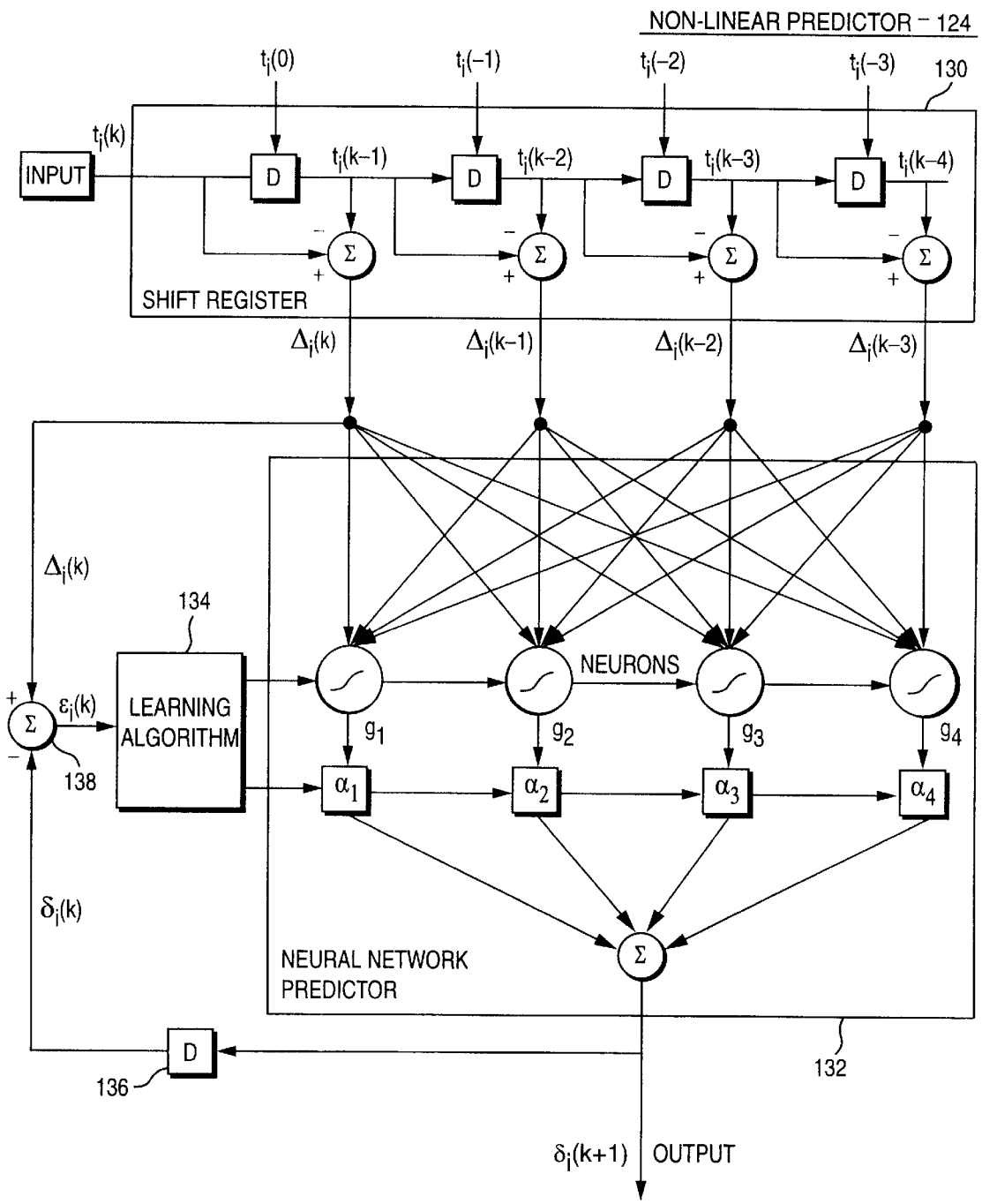
FIG. 14 is a diagram illustrating the non-linear predictor shown in FIG. 13.

The non-linear predictor 124 preferably employs a neural network prediction and learning approach as shown in FIG. 14. Of course, other types of predictors could be used such as Kalman filter-based model, a fuzzy, self-learning based model, etc. Packet arrives times $t_i(k)$ are input to a delay line type shift register 130. The output of each delay D is sent onto a next delay stage as well as input to a summing block. The output of each summer $\Sigma$ generates a time elapsed $\Delta_i(k)$ between two consecutive packets over the connection. When the connection i is established, k is set to zero as well as all of the inputs $t_i(0), \ldots t_i(-n+1)$, where n is the number of previous packets used to predict a future packet. Example values of n are 2, 3, or 4. Alternatively, initial non-zero packet arrival times $t_i(0), \ldots t_i(-n+1)$ may be set based upon statistically or otherwise empirically determined values. The initial connection state $C_i(0)$ is preferably set using a service vector $S_i$. For example, if $S_i$="First Class," then $C_i(0)$=DCH; if $S_i$="Business Class," then $C_i(0)$=FACH/RACH; and if $S_i$="Economy Class," then $C_i(0)$=PCH/RACH.

When a new packet arrives at time $t_i(k)$, k is incremented by 1 and the memory delay blocks are simultaneously updated. The shift register 130 outputs corresponding elapsed times $\Delta_i(k), \ldots, \Delta_i(k-3)$. An error signal $\epsilon_i(k)$ is generated by comparator 138 by determining the difference between $\Delta_i(k)$ and the previous predicted arrival time output from delay 136 corresponding to $\delta_i(k)$. The learning algorithm 134 is used to process the calculated error. Preferably, the learning scheme employs a standard recursive prediction error algorithm (RPEM) with a forgetting factor. However, other algorithms could be used such as recursive least squares (RLS). The parameters updated by the learning scheme 134 include a weight $\alpha$ for each neuron on neural network predictor 132 as well as a scalar $\beta$ (one for each input to the neuron) and a position $\gamma$ (one for each neuron). The scalar $\beta$ and position $\gamma$ parameters are shown in FIG. 13 as a corresponding activation function g, where g is also a function of $\Delta$. While the activation functions g are shown as sigmoids, they can also be Gaussians or any continuous function returning values between "0" and "1." A "1" means that the corresponding neuron is fully active, and a "0" means that the corresponding neuron is completely inactive.

In any event, the learning scheme looks at the deviation between the measured and predicted packet arrival times and tries to update the parameters of the activation functions so that this difference is reduced to the smallest value possible. The summed outputs of the weighted neuron outputs corresponds to the predicted next of packet arrival time $\delta_i(k+1)$. In FIG. 12, $\delta_i(k+1)=\alpha_1 g_1+\alpha_2 g_2+\alpha_3 g_3+\alpha_4 g_4$. Functions of the form $$\delta_i(k+1)=\alpha_1^i g_1^i(\Delta_i,\beta_1^i,\gamma_1^i)+ \ldots +\alpha_4^i g_4^i(\Delta_i,\beta_4^i,\gamma_4^i),$$

may be built where $\Delta_k(k)=\Delta_i(k) \ldots, \Delta_i(k-3)$. The activation function g may be chosen in different ways, e.g., as a sigmoid:

$$g_j^i(\Delta_i, \beta_j^i, \gamma_j^i) = \frac{1}{1 + e^{-(\beta_j^{iT}\Delta_i - \gamma_j^i)}},$$

where $\beta_j^i$ may be a vector with four components such as $$\beta_j^{iT}\Delta_i = \beta_j^i(1)\Delta_i(1)+\beta_j^i(2)\Delta_i(2)+\beta_j^i(3)\Delta_i(3)+\beta_j^i(4)\Delta_i(4).$$

Regarding the inputs to the selector 126, it may be assumed that the service vector $S_i(k)$ and the current connection $C_i(k)$ assume hard values. The other inputs may be described by soft values or fuzzy sets where the transition from being true to being false is gradual, and the degree of which is characterized by what is sometimes referred to as a membership function. Consider the following example:

| Input | Notation | Values (example) |
|---|---|---|
| Desired bearer service | $S_i$ | Economy, Business, First |
| Current connection state | $C_i(k)$ | DCH, TDCH, FACH/RACH, PCH/RACH |
| Predicted time to the next packet arrival | $\delta_i(k + 1)$ | Soon, Late |
| Radio interference | $I_i(k)$ | Low, High |
| Current packet queue length | $Q_i(k)$ | Short, Long |

| Output | Notation | Values (example) |
|---|---|---|
| Next connection state | $C_i(k + 1)$ | DCH, TDCH, FACH/RACH, PCH/RACH |

The mapping from the inputs to the output may be described by a number of rules, e.g., 1—if ($S_i$ is Economy) and ($C_i(k)$ is DCH), then apply the following rules:

| | |
|---|---|
| if ($Q_i(k)$ is Short), | then $C_i(k + 1)$ is *FACH/RACH* |
| if ($\delta_i(k + 1)$ is Soon) and ($Q_i(k)$ is Long), | then $C_i(k + 1)$ is *DCH* |
| if ($\delta_i(k + 1)$ is Late) and ($I_i(k)$ is Low) and ($Q_i(k)$ is Long), | then $C_i(k + 1)$ is *DCH* |
| if ($\delta_i(k + 1)$ is Late) and ($I_i(k)$ is High) and ($Q_i(k)$ is Long), | then $C_i(k + 1)$ is *DCH* |

2—if ($S_i$ is Business) and ($C_i(k)$ is FACH/RACH), then apply the following rules:

| | |
|---|---|
| if ($Q_i(k + 1)$ is Soon) and ($Q_i(k)$ is Short), | then $C_1(k + 1)$ is *FACH/RACH* |
| if ($I_i(k)$ is Low) and ($Q_i(k)$ is Long), | then $C_1(k + 1)$ is *TDCH* |
| if ($\delta_i(k + 1)$ is Soon) and ($I_i(k)$ is High) and ($Q_i(k)$ is Long), | then $C_i(k + 1)$ is *DCH* |
| if ($\delta_i(k + 1)$ is Late) and ($Q_i(k)$ is Short), | then $C_i(k + 1)$ is *PCH/RACH* |
| if ($\delta_i(k + 1)$ is Late) and ($I_i(k)$ is High) and ($Q_i(k)$ is Long), | then $C_i(k + 1)$ is *DCH* |

3—if ($S_i$ is First) and ($C_i(k)$ is TDCH), then apply the following rules:

| | |
|---|---|
| if ($I_i(k)$ is Low), | then $C_i(k + 1)$ is TDCH |
| if ($\delta_i(k + 1)$ is Soon) and ($I_i(k)$ is High) | then $C_i(k + 1)$ is DCH |
| if ($\delta_i(k + 1)$ is Late) and ($I_i(k)$ is High) and ($Q_i(k)$ is Short), | then $C_i(k + 1)$ is FACH/RACH |
| if ($\delta_i(k + 1)$ is Late) and ($I_i(k)$ is High) and ($Q_{i(k)}$ is Long), | then $C_i(k + 1)$ is DCH |

Because $S_i$ can be assigned three different values and $C_i(k)$ four different values, there are twelve different combinations of these inputs, each of which is associated with a set of rules of the kind given above. However, only one of these sets will be active at one time, so the computational burden is moderate.

The just-described, example embodiment of the present invention selects the optimal channel and mobility management scheme for a packet-switched connection. As a result, radio channel resources (e.g., CDMA spreading codes), are optimally utilized. Dedicated channels are used only when necessary or efficient. Users that do not have strict delay requirements may be allocated common channels with scheduled and queued transport. On the other hand, dedicated channels may be selected even for low data rates or small amounts of data in high interference conditions in order to minimize further interference. Using the present invention, it is possible to predict future packet bursts and to use that prediction to, in appropriate situations, change a channel type (and other connection state parameters) from one channel type to another to carry a next burst of packets.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. For use in a communications system supporting a packet data connection with a mobile station over a radio access network, a method comprising:
   determining for the packet data connection an amount of packet data to be sent;
   comparing the determined amount of packet data to an amount threshold;
   if the determined amount of packet data is less than or equal to the amount threshold, determining whether the amount of packet data is increasing or decreasing; and
   allocating the packet data connection to a shared type of radio channel configured to support packet data connections with plural mobile stations or a dedicated type of radio channel configured to support a packet data connection with one mobile station based on whether the amount of packet data is increasing or decreasing when the amount of packet data is less than the amount threshold.

2. The method in claim 1, further comprising:
   determining time intervals between packets over the packet data connection; and
   when the determined time intervals between packets are similar, deciding to assign the packet data connection to the dedicated type of radio channel.

3. The method in claim 1, wherein if the amount of packet data exceeds the amount threshold, the method further comprising:
   maintaining the packet data connection on the radio channel currently bearing the packet data connection if data is currently not flowing out of a buffer storing the amount of packet data to be sent.

4. The method in claim 1, further comprising:
   if the determined amount of packet data exceeds the amount threshold, the method further comprising:
   deciding that the packet data connection should not be transferred to the dedicated type of radio channel if data is currently not flowing out of a buffer storing the amount of packet data to be sent.

5. For use in a communications system supporting a packet data connection with a mobile station over a radio access network, a method comprising:
   determining for the packet data connection an amount of packet data to be sent;
   comparing the determined amount of packet data to an amount threshold;
   if the determined amount of packet data is greater than the amount threshold, considering a flow of packets of the packet data connection in deciding whether to assign a shared type of radio channel configured to support packet data connections with plural mobile stations or a dedicated type of radio channel configured to support a packet data connection with one mobile station, where if the determined amount of packet data is greater than the first amount threshold and if the flow of packets exceeds a flow threshold, the packet data connection is allocated to the dedicated type of radio channel.

6. The method in claim 5, the method further comprising:
   if the determined amount of packet data is less than or equal to the first amount threshold and if the amount of packet data is decreasing, allocating the packet data connection to the shared type of radio channel.

7. For use in a communications system supporting a packet data connection with a mobile station over a radio access network, a method comprising the steps of:
   determining for the packet data connection an amount of packet data to be sent;
   comparing the determined amount of packet data to a first amount threshold;
   if the determined amount of packet data is less than the first amount threshold, determining if a back pressure condition exists; and
   if a back pressure condition does not exist, selecting a shared type of radio channel that supports plural mobile station connections to bear the packet data connection rather than a dedicated type of radio channel that supports one mobile station connection at a time.

8. The method in claim 7, further comprising:
if a back pressure condition does exist, selecting a dedicated type of radio channel to bear the packet data connection.

9. The method in claim 7, further comprising:
if a back pressure condition does exist, maintaining a current type of radio channel to bear the packet data connection.

10. The method in claim 7, further comprising:
in selecting a radio channel type to bear the packet data connection, performing a channel type selection procedure in addition to the method defined in claim 7.

11. For use in a communications system supporting a packet data connection with a mobile station over a radio access network, a method comprising the steps of:
determining for the packet data connection an amount of buffered packet data to be sent;
comparing the determined amount of packet data to a first buffer amount threshold;
if the determined amount exceeds the first buffer amount threshold, comparing the determined amount of packet data to a second buffer amount threshold; and
establishing the packet data connection on or transferring the packet data connection to one of a dedicated type of radio channel and a shared type of radio channel taking into account the first and second buffer amount threshold comparisons.

12. The method in claim 11, further comprising:
if the determined amount of buffered packet data exceeds the second threshold, establishing the packet data connection on or transferring the packet data connection to a dedicated type of radio channel.

13. The method in claim 11, further comprising:
if the determined amount of buffered packet data exceeds the second threshold, determining if data are not currently being transmit over the packet data connection, wherein if data are not currently being transmit over the packet data connection maintaining the packet data connection on the type of radio channel currently bearing the packet data connection.

14. The method in claim 13, wherein if data are currently being transmit over the packet data connection, the method further comprising:
selecting a dedicated type of radio channel to bear the packet data connection.

15. The method in claim 11, further comprising:
if the determined amount of packet data is greater than the first buffer amount threshold and less than the second buffer amount threshold, employing hysteresis when selecting the type of radio channel to bear the packet data connection.

16. The method in claim 15, further comprising:
determining whether the determined amount of buffered packet data decreased from being greater than the second buffer amount threshold to being less than the second buffer amount threshold, and if so, selecting a dedicated type of radio channel to bear the packet data connection.

17. The method in claim 16, wherein if determined amount of buffered packet data increased from being less than the first buffer amount threshold to being greater than the first buffer amount threshold, the method further comprising:
selecting a shared type of radio channel to bear the packet data connection.

18. The method in claim 16, wherein if determined amount of buffered packet data increased from being less than the first buffer amount threshold to being greater than the first buffer amount threshold, the method further comprising:
selecting a type of radio channel to bear the packet data connection taking into account another factor in addition to comparing a buffer amount to the first and second buffer amount thresholds.

19. For use in a communications system providing communication with mobile stations by way of a radio access network, apparatus comprising:
a packet buffer for storing packets to be sent over a packet data connection with a mobile station, and
a connection state selector configured to select one of a dedicated type of radio channel and a shared type of radio channel to bear the packet data connection based on an amount of data currently stored in the packet buffer,
wherein a dedicated type of radio channel supports one mobile station connection at a time and a shared type of radio channel supports plural mobile station connections.

20. The apparatus in claim 19, wherein the connection state selector is configured to compare the amount of packet data in the packet buffer to a first threshold and a second threshold greater than the first threshold.

21. The apparatus in claim 20, wherein if the amount of packet data in the packet buffer is less than both the first threshold and the second threshold, the connection state selector is configured to select the shared type of radio channel.

22. The apparatus in claim 20, wherein if the amount of packet data is greater than the first threshold and greater than the second threshold, the connection state selector is configured to maintain the packet data connection on a current type of radio channel.

23. The apparatus in claim 20, wherein if the amount of packet data is greater than the first and second thresholds, the connection state selector is configured to select a dedicated type of radio channel to carry the packet data connection.

24. The apparatus in claim 20, wherein if the amount of packet data in the packet buffer is greater than or equal to the first threshold and less than the second threshold, the connection state selector is configured to determine the type of radio channel taking into account at least one additional parameter.

25. The apparatus in claim 20, wherein if the amount of packet data in the packet buffer is greater than the first threshold and less than the second threshold, the connection state selector is configured to select a dedicated type of radio channel to carry the packet data connection.

26. The apparatus in claim 20, wherein if the amount of packet data in the packet buffer is greater than the first threshold and less than the second threshold, the connection state selector is configured to select a shared type of radio channel to carry the packet data connection.

27. The apparatus in claim 19, further comprising:
a packet store providing packets to the packet buffer,
wherein when an amount of packets currently stored the packet buffer exceeds a predetermined percentage of the packet buffer size, the packet buffer is configured to generate a back pressure signal used to instruct the packet store to temporarily halt transmission of packets to the packet buffer.

28. The apparatus in claim 27, wherein the connection state selector is configured to compare the amount of packet data in the packet buffer to a first threshold, and if the amount of packet data in the packet buffer is less than the first threshold and if the back pressure signal is not present, the connection state selector is configured to select the shared type of radio channel.

29. The apparatus in claim 27, wherein the connection state selector is configured to compare the amount of packet data in the packet buffer to a first threshold, and if the amount of packet data in the packet buffer is less than the first threshold and if the back pressure signal is not present, the connection state selector is configured to determine the radio channel type using an additional parameter relating to packet flow.

30. The apparatus in claim 29, wherein the additional parameter is traffic intensity.

31. The apparatus in claim 29, wherein the additional parameter is time between packet arrivals.

32. The apparatus in claim 29, wherein the connection state controller compares the amount of packet data in the packet buffer to a first threshold, and if the amount of packet data in the packet buffer is less than the first threshold and if the back pressure signal is present, the connection state selector is configured to select the dedicated type of radio channel.

33. The apparatus in claim 19, further comprising:
a protocol window buffer used to monitor packets transmitted from the packet buffer but not yet acknowledged as received, the protocol window buffer configured to generate a full window signal when the number of not yet acknowledged packets exceeds a predetermined threshold.

34. The apparatus in claim 33, wherein if the amount of packet data in the packet buffer is less than a first threshold and if the full window signal is not present, the connection state selector is configured to select the dedicated type of radio channel to bear the packet data connection.

35. The apparatus in claim 33, wherein if the amount of packet data in the packet buffer is less than a first threshold and if the full window signal is present, the connection state selector is configured to maintain the radio channel type currently being used to bear the packet data connection.

36. The apparatus in claim 33, wherein if the amount of packet data in the packet buffer is greater than a first threshold and a second larger threshold, and if the full window signal is present, the connection state selector is configured to maintain a current type of radio channel to bear the packet data connection.

37. The apparatus in claim 19, wherein if the determined amount of packet data is greater than the first threshold and less than the second threshold, the connection state selector is configured to employ hysteresis when selecting the type of radio channel to bear the packet data connection.

38. The apparatus in claim 19, wherein the connection state selector is configured to determine whether the determined amount of packet data decreased from being greater than the second amount threshold, and if so, the connection state selector is configured to select a dedicated type of radio channel to bear the packet data connection.

39. The apparatus in claim 19, wherein the connection state selector is configured to determine whether the amount of packet data increased from being less than the first amount threshold, and if so, the connection state selector is configured to select a shared type of radio channel to bear the packet data connection.

40. The apparatus in claim 19, wherein the connection state controller determines whether the amount of packet data increased from being less than the first amount threshold, and if so, the connection state selector is configured to select a type of radio channel to bear the packet data connection taking into account another factor in addition to comparing the amount of data to the first and second amount thresholds.

41. For use in a Code Division Multiple Access (CDMA) mobile radio communications system providing communication with mobile stations by way of a radio access network, the radio access network supporting one or more of the following connection states including a dedicated connection state that employs a dedicated type of radio channel (DCH), a shared connection state the employs a temporary DCH (TDCH), a shared connection state used by plural mobile terminals at the same time that employs a forward access type of radio channel (FACH) or a random access type of radio channels (RACH), and a shared connection state used by plural mobile terminals at the same time that employs a paging type of radio channel (PACH) or a random access type of radio channels (RACH), apparatus comprising:
a packet buffer for storing packets to be sent over a packet data connection with a mobile station, and
a connection state selector configured to select one of the DCH, TDCH, FACH or RACH, and PACH or RACH connection states to bear the packet data connection based on the amount of data currently stored in the packet buffer.

42. The apparatus in claim 41, wherein connection state selector is configured to select a connection state that employs a FACH or RACH type of radio channel to bear the packet data connection if the amount of data currently stored in the packet buffer is below a threshold.

43. The apparatus in claim 41, wherein the connection state selector is configured to select one of the connection states for the packet data connection based on plural ones of the following: the amount of data currently stored in the packet buffer compared to a buffer threshold, a predicted time to a next packet arrival compared to a time threshold, a detected interference in a cell supporting the packet data connection compared to an interference threshold, and a current connection state for the packet data connection.

44. The apparatus in claim 41, wherein the connector state selector is configured to account for a bearer service associated with the packet data connection when selecting a next connection state.

45. The apparatus in claim 41, wherein each connection state is associated with a mobility management scheme.

46. The apparatus in claim 41, wherein the connection state selector is configured to select a connection state that employs a DCH type of radio channel to bear the packet data connection if the amount of data currently stored in the packet buffer is equal to or above a threshold.

47. The apparatus in claim 41, wherein the connection state selector is configured to select a connection state that employs a DCH type of radio channel to bear the packet data connection if the amount of data currently stored in the packet buffer is equal to or above buffer threshold and a predicted time to a next packet arrival is below a time threshold.

48. The apparatus in claim 41, wherein the connection state selector is configured to select a connection state that employs a DCH type of radio channel to bear the packet data connection if the amount of data currently stored in the packet buffer is equal to of above buffer threshold, a predicted time to a next packet arrival is equal to or above a time threshold, and a detected interference in a cell supporting the packet data connection is less than an interference threshold.

49. The apparatus in claim 41, wherein the connection state selector is configured to select a connection state that employs a DCH type of radio channel to bear the packet data connection if the amount of data currently stored in the packet buffer is equal to or above buffer threshold, a predicted time to a next packet arrival is equal to or above a time threshold, and an interference associated with a cell supporting the packet data connection is equal to or above an interference threshold.

50. The apparatus in claim 41, wherein the connection state selector is configured to select a next connection state that employs a FACH or RACH type of radio channel to bear the packet data connection if the amount of data currently stored in the packet buffer is below a buffer threshold, a predicted time to a next packet arrival is below a time threshold, and a current connection state bearing the packet data connection employs a FACH or RACH type of radio channel.

51. The apparatus in claim 41, wherein the connection state selector is configured to select a next connection state that employs a TDCH type of radio channel to bear the packet data connection if the amount of data currently stored in the packet buffer is equal to or above buffer threshold and an interference associated with a cell supporting the packet data connection is below an interference threshold.

52. The apparatus in claim 41, wherein the connection state selector is configured to select a next connection state that employs a TDCH type of radio channel to bear the packet data connection if the amount of data currently stored in the packet buffer is equal to or above buffer threshold and an interference associated with a cell supporting the packet data connection is below an interference threshold.

53. The apparatus in claim 41, wherein the connection state selector is configured to select a next connection state that employs a DCH type of radio channel to bear the packet data connection if the amount of data currently stored in the packet buffer is equal to or above buffer threshold, an interference associated with a cell supporting the packet data connection is equal to or above an interference threshold, and a predicted time to a next packet arrival is below a time threshold.

54. The apparatus in claim 41, wherein the connection state selector is configured to select a next connection state that employs a PCH or RACH type of radio channel to bear the packet data connection if the amount of data currently stored in the packet buffer is less than a buffer threshold and a predicted time to a next packet arrival is equal to or above a time threshold.

55. The apparatus in claim 41, wherein the connection state selector is configured to select a next connection state that employs a DCH type of radio channel to bear the packet data connection if the amount of data currently stored in the packet buffer is equal to or above a buffer threshold, a predicted time to a next packet arrival is equal to or above a time threshold, and an interference associated with a cell supporting the packet data connection is equal to or above an interference threshold.

56. The apparatus in claim 41, wherein the connector state selector is configured to account for a current connection state supporting the packet data connection when selecting a next connection state supporting the packet data connection.

57. The apparatus in claim 41, wherein the connection state selector is configured to select a next connection state that employs a TDCH type of radio channel to bear the packet data connection if an interference associated with a cell supporting the packet data connection is below an interference threshold and a current connection state bearing the packet data connection employs a TDCH type of radio channel.

58. The apparatus in claim 41, wherein the connection state selector is configured to select a next connection state that employs a DCH type of radio channel to bear the packet data connection if an interference associated with a cell supporting the packet data connection is equal to or above an interference threshold and a predicted time to a next packet arrival is below a time threshold.

59. The apparatus in claim 41, wherein the connection state selector is configured to select a next connection state that employs a FACH or RACH type of radio channel to bear the packet data connection if an interference associated with a cell supporting the packet data connection is equal to or above an interference threshold, a predicted time to a next packet arrival is equal to or above a time threshold, and if the amount of data currently stored in the packet buffer is below a buffer threshold.

60. The apparatus in claim 41, wherein the connection state selector is configured to select a next connection state that employs a DCH type of radio channel to bear the packet data connection if an interference associated with a cell supporting the packet data connection is equal to or above an interference threshold, a predicted time to a next packet arrival is equal to or above a time threshold, and if the amount of data currently stored in the packet buffer is above a buffer threshold.

\* \* \* \* \*